Jan. 23, 1923.
S. F. SUTHERLAND.
COLLAPSIBLE FOLDING BOX.
FILED MAY 17, 1921.
1,443,054
5 SHEETS-SHEET 2
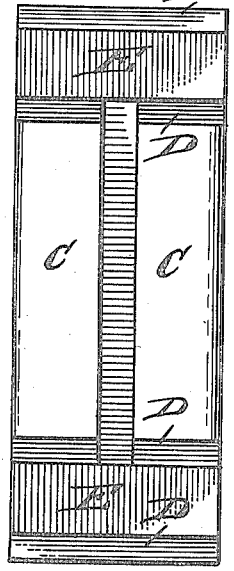
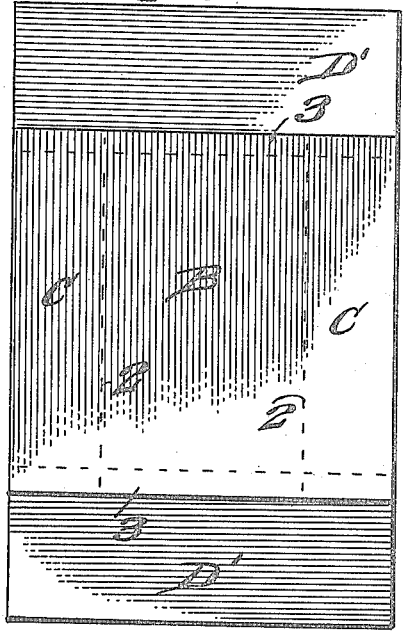
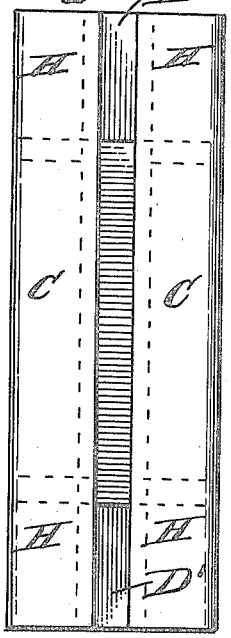
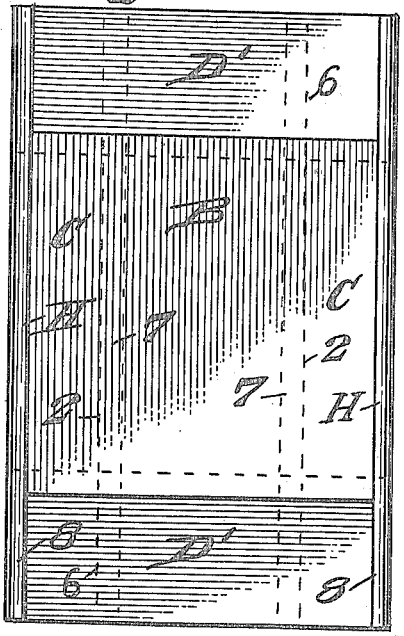
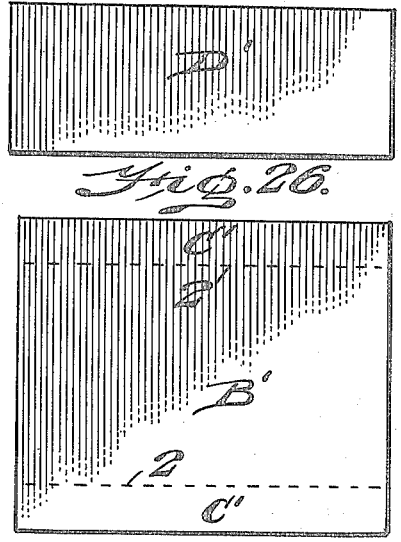
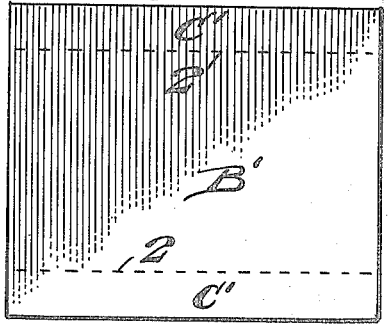
WITNESSES:
INVENTOR
Stafford F. Sutherland
BY
Eccleston & Eccleston
ATTORNEY

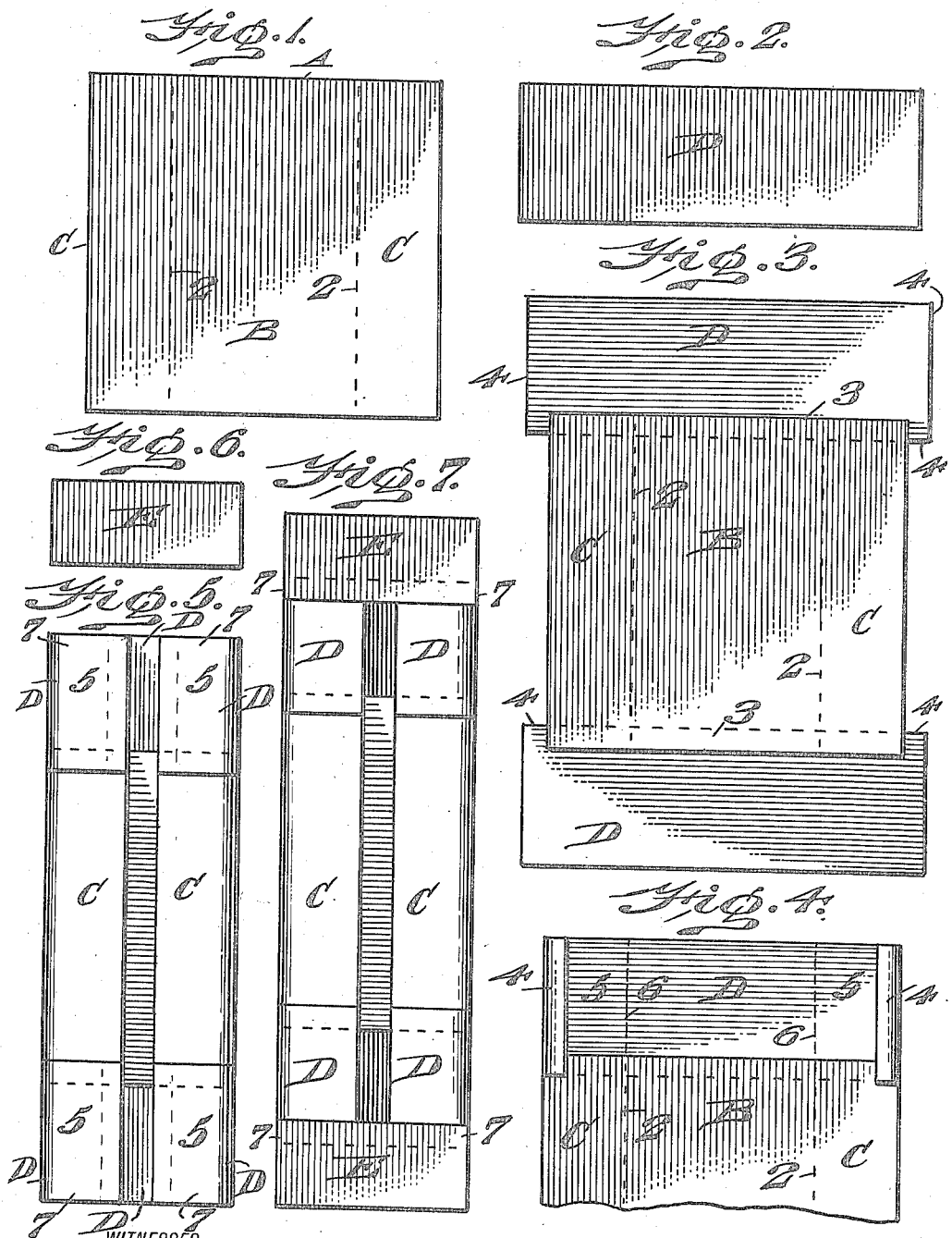

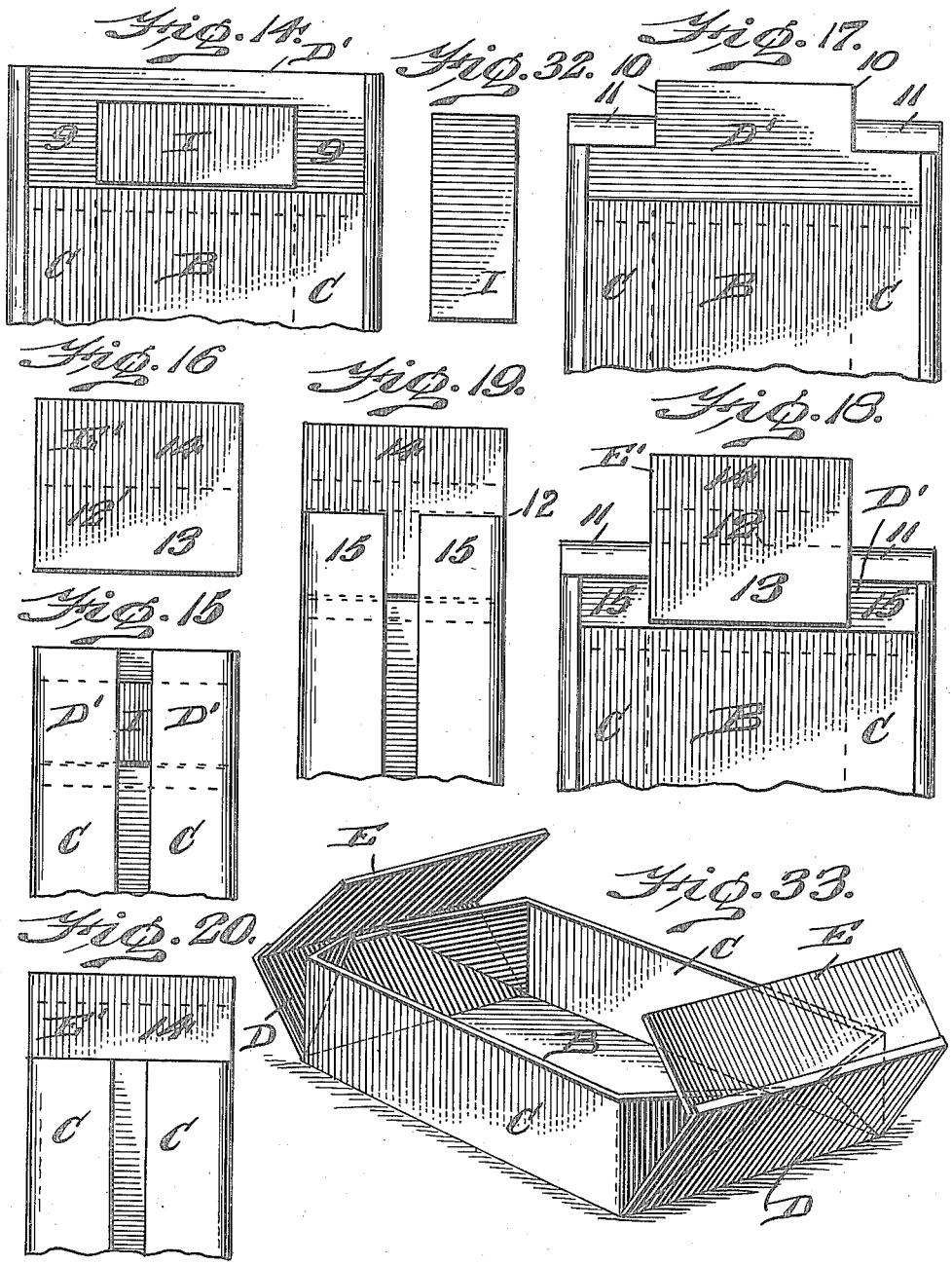

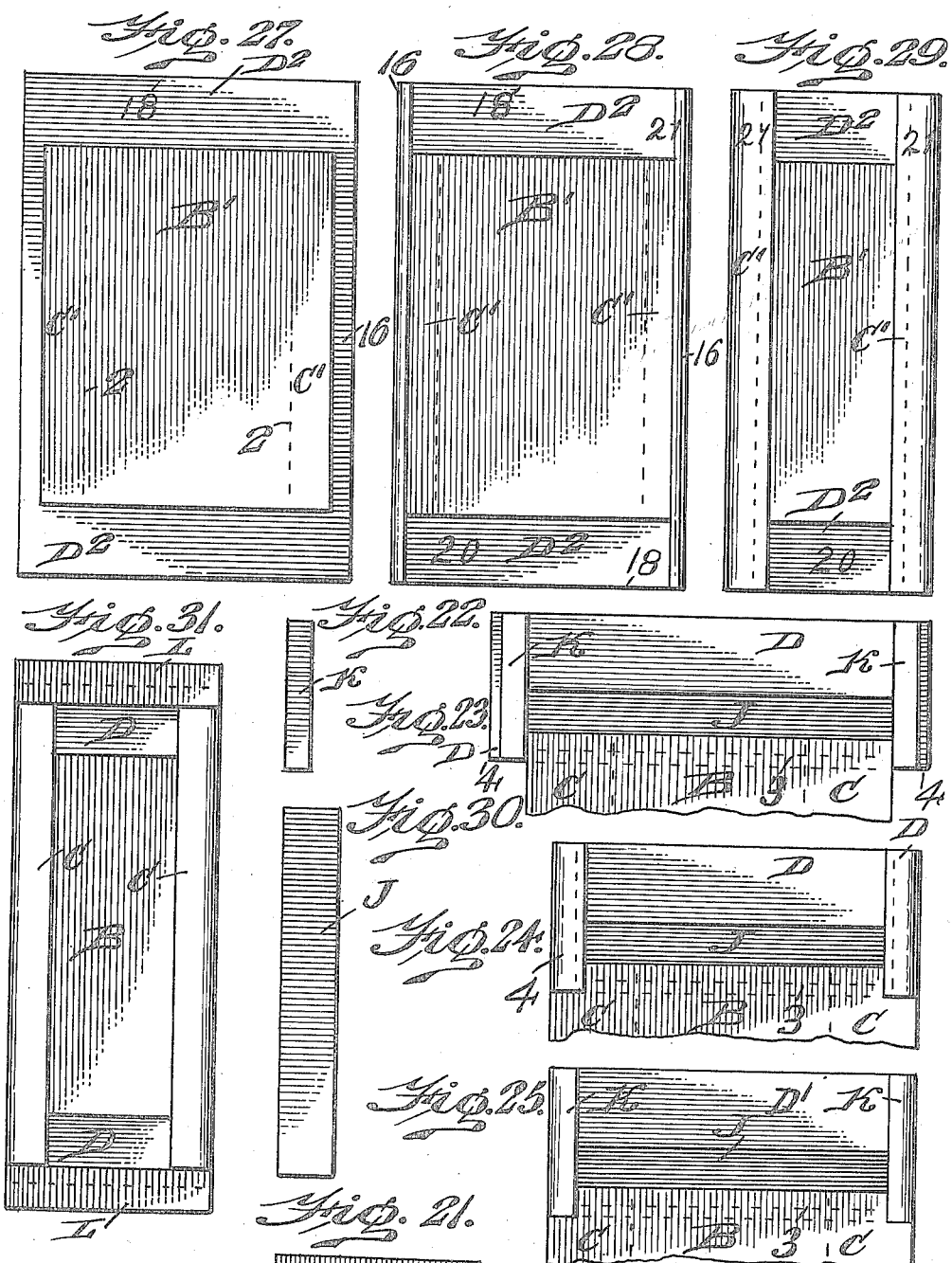

Jan. 23, 1923.
S. F. SUTHERLAND.
COLLAPSIBLE FOLDING BOX.
FILED MAY 17, 1921.
1,443,054
5 SHEETS-SHEET 5
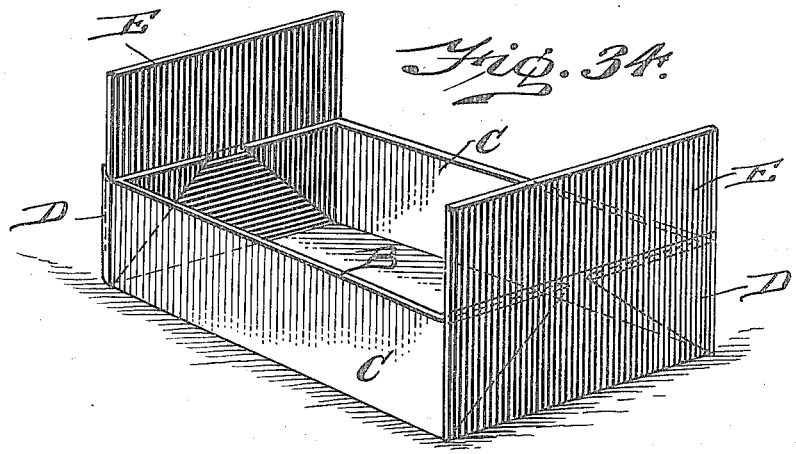
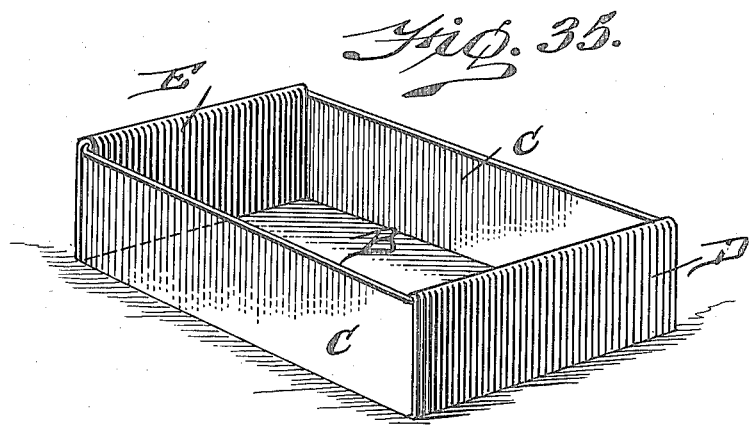
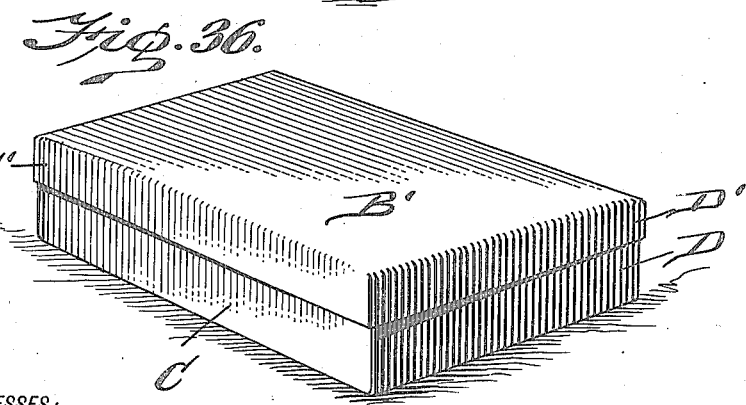

Patented Jan. 23, 1923.

1,443,054

UNITED STATES PATENT OFFICE.

STAFFORD F. SUTHERLAND, OF PHILADELPHIA, PENNSYLVANIA.

COLLAPSIBLE FOLDING BOX.

Application filed May 17, 1921. Serial No. 470,327.

*To all whom it may concern:*

Be it known that I, STAFFORD F. SUTHERLAND, a citizen of the United States, residing in the city and county of Philadelphia and State of Pennsylvania, have invented certain new and useful Improvements in Collapsible Folding Boxes, of which the following is a specification.

My invention relates to folding boxes and especially to that type known as collapsible boxes, and the object of my invention is to provide an improved box of this character, that is simple in construction, inexpensive of manufacture and can be very easily and very quickly set up—that is, erected in box form—and is very securely held in erect position after it is set up, and also presents a very neat appearance.

Another object of my invention is to provide a collapsible folding-box, that may be made of cheap box-board (board, such as is now used for making what is known as set-up boxes, that is, boxes that are made set-up or erect and are not collapsible) and which may be covered or partly covered with paper or other suitable material.

A further object of my invention, is to provide a collapsible folding-box that has separate end-walls or separate double end walls—that is, opposite walls or members, that are not integral parts of the blank from which the other opposite walls or members and the bottom or central members are formed—and which are attached to the box by new and novel means.

These and other objects and advantages of my improved box, will be readily apparent in this specification when taken in connection with the accompanying drawings, in which—

Fig. 1 is the blank from which the bottom or central member and two opposite sides or members of the box are formed; Fig. 2 is a connecting-strip; Figs. 3 and 4 show the connecting-strips attached to opposite ends of the blank; Fig. 5 shows the side-walls or side members folded inwardly on the blank; Fig. 6 is the end-wall or end member; Fig. 7 shows this end-wall (Fig 6) attached to the box; Fig. 8 shows the complete box with the end-walls folded inwardly on the box; Fig. 9 is a connecting-strip; Fig. 10 shows this strip attached to opposite ends of the blank; Fig. 11 is a covering-strip; Fig. 12 shows this covering-strip attached to and covering opposite side-walls; Fig. 13 shows the side walls of this box (Fig. 12) folded inwardly; Fig. 32 is an extra end wall or end member; Fig. 14 shows this end wall placed on the central part of the connecting-strip to strengthen it; Fig. 15 shows the outer portions of the strip folded on this end wall; Fig. 16 is a double end-wall; Fig. 17 shows a modification of the connecting-strip, attached to the blank; Fig. 18 shows the double end-wall attached to the connecting-strip (Fig. 17); Fig. 19 shows the side-walls of this box, folded inwardly; Fig. 20 shows the complete box with the outer end of the double end-wall, folded inwardly on the box; Figs. 22 and 30 are reinforcing-strips; Figs. 23, 24 and 25 show these reinforcing strips attached to the connecting-strip and to the box; Fig. 26 is a blank of the box-cover; Figs. 27 and 28 show this blank attached to and covered by a covering-sheet; Fig. 29 shows the side-walls of this cover folded inwardly; Fig. 21 is the end-wall of the cover; Fig. 31 shows the end-wall attached to the cover; Figs. 33 and 34 are perspectives of the box, partly set-up; Fig. 35 is a perspective of the box, fully set-up; and Fig. 36 is a perspective of the box with its cover on it.

Referring to the drawings Fig. 1 is the blank A of which this box is partly made. It is a single piece of paper-board or other suitable material, and is creased or scored at the dotted lines 2, so as to facilitate the bending or folding of its parts or members at these lines in forming the box; and this blank comprises the following, integrally connected and foldable parts or members—a bottom or central member B and opposite side-walls or members C. A strip of paper or other suitable material (Fig. 2) and which I will call the connecting-strip D is gummed to each end 3 of the blank as shown in Fig. 3, and the projecting edges 4 are turned over and gummed, as shown in Fig. 4. The side-walls C of the blank and the parts 5 of the connecting-strips are then folded inwardly along the scored lines 2 of the blank and the dotted lines 6 of the paper strip as shown in Fig. 5, and a strip of paper-board (Fig. 6) of the desired thickness and which I will call the end-wall E is gummed to each outer end 7 of the connecting-strip D, as shown in Fig. 7, and the box is then complete. Fig. 8 shows the complete box with the end-walls E folded inwardly on the box. The end-walls E will of course be of the same depth as the side-walls C and will extend to the bottom of the box, when it is set up. In this set up condition of the box the end edges of the end members E frictionally engage the side walls or members of the box and are thus held in locking position. If it is desired to cover the side-walls of the box, this may be done in the following manner:—

A connecting strip $D^1$ (Fig. 9) is gummed to each end 3 of the blank, as shown in Fig. 10, and a strip of paper, or other suitable material (Fig. 11) and which I will call the covering-strip H, is attached to each side-wall, the lower edge 7 of the strip being pasted to the bottom of the box and the upper edge 8 turned over and pasted on the inner face of the side-wall, as shown in Fig. 12. The side-walls C and the adjacent parts of the attached connecting-strip $D^1$, are then folded inwardly along the scored lines 2 of the blank and the dotted lines 6 of the strip, as shown in Fig. 13 and the end-wall E (Fig. 6) attached to the connecting strip in the manner before described and shown in Fig. 7. If it is desired to reinforce the connecting-strip, a strip of light paper-board or heavy paper I may be laid on the inner face of the central part of the connecting strip $D^1$ as shown in Fig. 14, and the outer parts 9 of the strip then folded inwardly over it as shown in Fig. 15, and the end-wall E (Fig. 6) attached in the manner before described and shown in Fig. 7.

A double end-wall may also be used. In this case, the connecting-strip $D^1$ may be slit at 10 and the portions 11 turned in, as shown in Fig. 17. The double end-wall $E^1$ (Fig. 16) is scored or creased at the dotted line 12 and is foldable along that line, and comprises the lower part 13 and the upper part 14, and it is attached to the connecting-strip $D^1$ by placing the lower part 13 on the central part of the strip, as shown in Fig. 18, and then folding the outer parts 15 of the strip on the double end-wall as shown in Fig. 19, and the turned in portion 11 of the strip gummed to the wall; the upper part 14 of the double end-wall may then be folded at the scored line 12, inwardly on the box, as shown in figure 20. The paper connecting-strip may also be reinforced and strengthened by gumming a strip J, Fig. 30 of paper, cloth, or any other suitable material to the edge 3 of the blank and then gumming the connecting-strip D or $D^1$ over it, as shown in Figs. 23, 24 and 25; and it may still further be reinforced and strengthened by gumming strips K (Fig. 22) of paper, cloth or any other suitable material to the projecting parts 4 of the connecting-strip D before they are turned in, as shown in Figs. 23 and 24; or simply gumming them to opposite edges of the connecting strip $D^1$ as shown in Fig. 25. Fig. 26, is the blank of the box-cover. This blank is the same as the blank A (Fig. 1) except in its dimensions, and comprises the following integrally connected and foldable parts—a top $B^1$ and opposite side-walls $C^1$. In Fig. 27, the blank of the box-cover is shown attached to and covered by the sheet of paper or other suitable material, and which I will call the covering sheet $D^2$.

The edges 16 of the covering-sheet extend beyond the edges of the side-walls and are turned over and pasted on the inner face of the side-wall, as shown in Fig. 28, the other opposite edges 18 of the sheet, also extending beyond the edges of the blank. The side-walls are then folded inwardly on the blank, as shown in Figure 29, and an end-wall L (Fig. 21. attached to each edge 18 of the projecting portion 20 of the covering-sheet $D^2$, as shown in Fig. 31, and this part 20 of the covering sheet $D^2$ takes the place of the connecting-strips D and $D^1$ before shown and described.

It is of course obvious that the box, may be made and covered in the same manner as the box-cover, or the cover may be made and covered in the same manner as the box.

In Figs. 33 and 34 the box is shown partly set-up; in Fig. 35, it is shown fully set-up and in Fig. 36, it is shown with its cover on it. It will be seen from the preceding description and drawings, that the connecting-strip D or $D^1$—or as in the case of the cover, the projecting portion 20 of the covering-sheet—connects the end-wall with the bottom and side-walls of the box; and the outer portions 5 of the connecting-strip D (Fig. 5) or 15 of the strip $D^1$ (Fig. 19) as the case may be; or the outer portions 21 of the projecting part 20 of the covering-sheet $D^2$ (Fig. 29); are in each and every case corner-folds and will fold inwardly in the box, when it is set-up. To set up the box from its flat form, it is only necessary to grasp both side-walls and bring them to an erect position and the connecting-strips at opposite ends of the box will automatically move to an erect position taking the end-walls with them and these end-walls will move inwardly to an erect position against the inner face of the connecting-strip and its adjacent corner-folds and the box will then be held very securely against collapse.

Having fully described my invention, what I claim as new and desire to secure by Letters Patent is:

1. A collapsible box including integral bottom and side walls of stiff cardboard, a separate end member of substantially the dimensions of the end of the box, and a relatively thin connecting strip secured to the end member and the box body.

2. A collapsible box including foldable bottom and side walls of stiff cardboard, a separate end member of substantially the dimensions of the end of the box, and a relatively thin connecting strip secured to the end member and the box body.

3. A collapsible box including foldable bottom and side walls, separate and independent end walls, and means for connecting the end walls with the bottom of the box.

4. A collapsible box including foldable bottom and side walls, separate and independent end walls, and a facing strip attached to one edge of each of the end walls and connected to the bottom and side walls of the box.

5. A collapsible box including foldable bottom and side walls, separate end members, flexible means connecting the end members with the bottom of the box, said end members being of such dimensions as to frictionally engage the side walls of the box when the latter is in set-up position.

6. A collapsible box including foldable bottom and side walls, a connecting strip secured to said bottom and side walls and forming extensions thereof, and means connecting the extensions of the side walls, said means adapted to hold the side walls in erect position when the box is set-up.

7. A collapsible box including foldable bottom and side walls, a flexible connecting strip secured to said bottom and side walls and forming extensions thereof, and an end member secured to the extensions of said side walls.

8. A collapsible box including foldable bottom and side walls, a flexible connecting strip secured to said bottom and side walls and forming extensions thereof, and an end member secured to the extensions of said bottom and side walls.

9. A collapsible box including foldable bottom and side walls, a flexible facing strip covering said bottom and side walls and forming extensions on the ends thereof, and end members secured to the extensions of the side walls.

10. A collapsible box including foldable bottom and side members, a connecting strip secured to the bottom and side members and extending beyond the end of the bottom and side members a distance greater than the depth of the box, an end member secured to the extremity of the connecting strip, and a second end member inserted between the first-named end member and the bottom of the box.

11. A collapsible box including foldable bottom and side members, a rectangular facing strip secured to the bottom and side members and extending beyond the ends of the bottom and side members a distance greater than the depth of the box, end members secured to the extremities of the facing strip, and a second end member inserted between each of the first-named end members and the bottom of the box.

STAFFORD F. SUTHERLAND.